Patented Nov. 10, 1953

2,658,863

UNITED STATES PATENT OFFICE 2,658,863

PROCESS AND APPARATUS FOR INCREASING VACUUM TOWER PRODUCTION

John R. Guala, Bywood, Upper Darby, Pa., assignor to Gulf Oil Corporation, Pittsburgh, Pa., a corporation of Pennsylvania Application July 15, 1952, Serial No. 298,986

13 Claims. (Cl. 202—40)

This invention relates to a process and apparatus for increasing vacuum tower production and particularly to vacuum fractionation systems and methods employed in connection with the separation of thermally decomposable liquid mixtures such as hydrocarbon oils.

In the fractional distillation of hydrocarbon oils and the like in a vacuum fractionating tower, feed oil heated to a high temperature is introduced into the vacuum tower. The reduced pressure at which the tower is operated and the high temperature of the oil at the time of its introduction into the tower results in instantaneous vaporization or a "flashing" of part of the feed oil into vapor. The resulting vapor is then passed upwardly in the tower through a fractionation or distillation zone which may comprise a plurality of bubble cap trays or equivalent elements.

In the fractionating zone the upwardly moving vapors are passed countercurrently to condensed liquid moving downwardly over the trays. Vapors not condensed during their passage through the distillation zone are removed from the top of the tower and passed through heat exchange equipment or condensing apparatus for further processing.

In most cases the vacuum producing means are employed in association with the condensing apparatus to create within the tower the reduced pressure necessary for the operation of the vacuum tower.

The passage of vapor from the tower flash zone up through the fractionating trays results in a substantial pressure drop between the vacuum producing equipment and the flash zone due to the friction created by the passage of the vapors through the bubble caps and the liquid on the trays. The pressure drop between the vacuum producing equipment and the tower flash zone is further increased by the presence of steam normally introduced into the vacuum tower flash zone to lower the oil partial pressure and to assist in vaporization of the feed.

In addition to the steam normally introduced into the tower zone, steam or other stripping vapor is also introduced into the liquid oil present in the lower portion of the tower beneath the tower flash zone. This steam, referred to as stripping steam, is introduced to effect final separation of lighter components from the higher boiling liquid oil. This liquid oil, referred to as bottoms, may comprise that portion of the heated feed oil which on introduction into the tower flash zone does not vaporize, but remains in the liquid state.

The stripping steam introduced into the liquid bottoms, similarly as the steam introduced into the flash zone, causes a lowering of the partial vapor pressure throughout the liquid to such an extent that the light ends contained in the bottoms will be vaporized. The passage of these light ends and the stripping steam upwardly, together with vapors from the flash zone, through the fractionating zone (which is the practice in conventional operations) adds further to the pressure drop existing between the vacuum producing equipment and the tower flash zone, due to the increased friction resulting from the increased volume of rising vapors. The pressure differential between the top of the tower, where the vacuum producing equipment is most effective, and the lower portion of the tower is a factor which should be kept to a minimum for maximum vaporization. The higher pressure which conventionally exists in the stripping zone increases the requirements of stripping steam which must be used in this zone. The additional steam used to effect the stripping, when mingled with stripped light end vapors further increases the burden on vacuum producing apparatus due to the further increased pressure drop between the overhead line and the stripping zone.

It is an object of this invention to provide a vacuum distillation process and apparatus by which the pressure drop between the upper portion of the vacuum tower and the stripping zone is substantially reduced.

A more limited object is to provide a process and apparatus accomplishing the above object, while at the same time providing additional structural support to the tower.

It is a further object to provide an improved process and apparatus which will accomplish the foregoing objects, while at the same time reducing the residence time in the tower of the stripped liquid.

It is still a further object of this invention to provide a vacuum distillation process and apparatus which will produce a greater amount of total overhead product, and which will also provide an improved rate of increase in total overhead, upon the introduction of additional stripping steam, over that produced by conventional vacuum distillation apparatus using the same additional quantity of stripping steam. Other objects will be apparent from the following description.

These and other objects are accomplished by my invention which comprises introducing a preheated liquid-containing feed into a flash zone, passing vaporized constituents from the flash zone upwardly into the bottom of a fractionating zone, and passing these vapors through the fractionating zone in countercurrent contact with downflowing condensate. Unvaporized liquid from the flash zone is passed downwardly through a stripping zone in countercurrent contact with stripping vapor flowing upwardly therethrough. Stripped and stripping vapors are passed directly from the stripping zone into the fractionating zone substantially above the bottom thereof, whereby the pressure drop between the top of the fractionating zone and the stripping zone is reduced substantially. The path of flow of the stripped and stripping vapors in one embodiment, preferably, but not necessarily, passes substantially centrally of the fractionating zone. Throughout the process a partial vacuum is maintained or drawn in the top of the fractionating zone and thus throughout each of said zones. Unvaporized liquid is removed from the bottom of the stripping zone, and fractionated material is removed from the fractionating zone. The invention also includes apparatus for carrying out the process.

Figure 1:
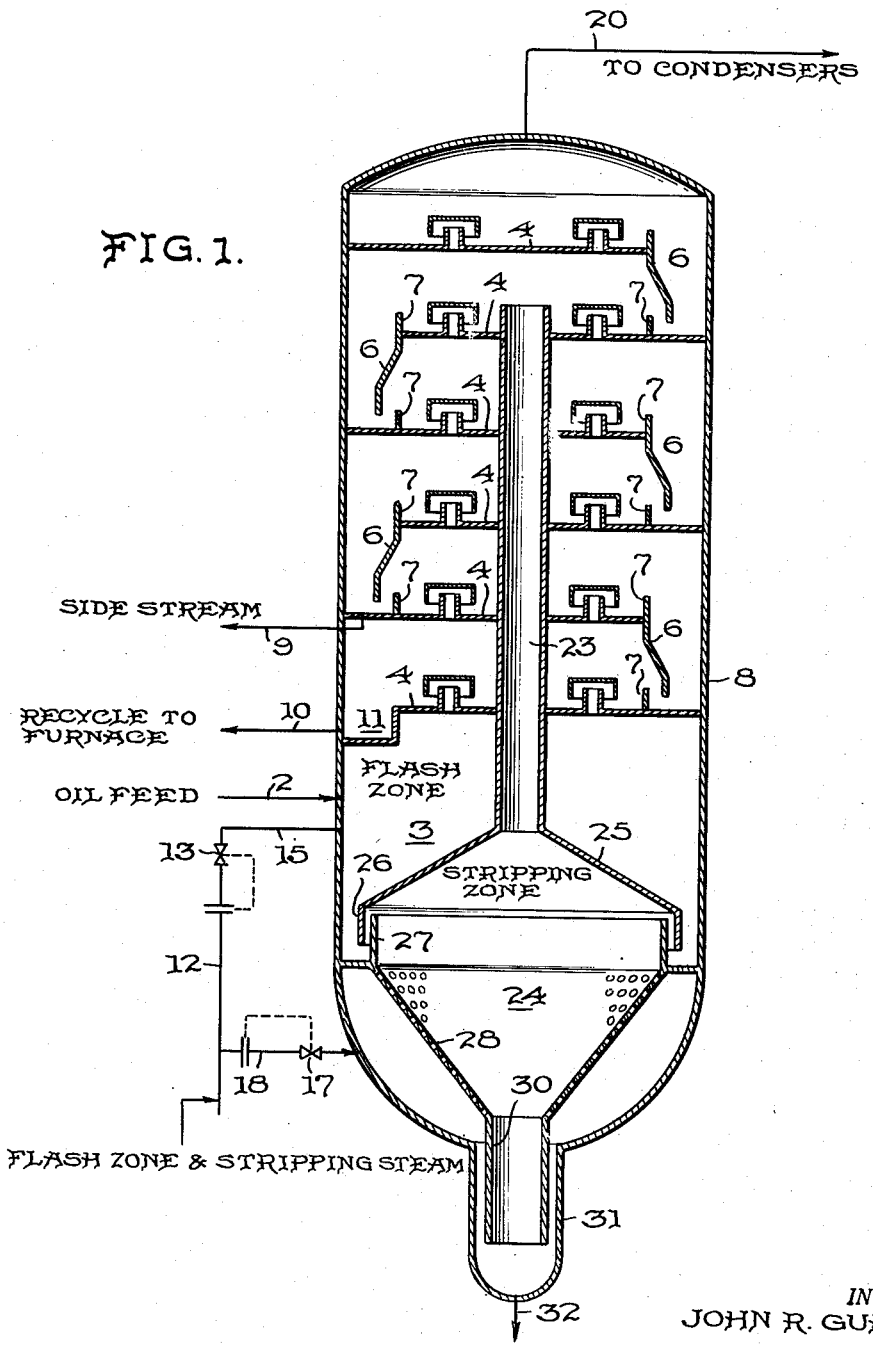
Figure 1 is a diagrammatic view of one preferred form of the vacuum distillation apparatus of this invention.

Referring to Figure 1 of the drawing, numeral 8 represents the shell of a vacuum fractionating tower having feed inlet line 2 in the side of the shell. For simplicity, the apparatus will be described in connection with the distillation of a petroleum oil. The feed oil, which is heated to a high temperature and partially vaporized by conventional heating apparatus, not shown, is introduced by way of oil feed line 2 into the flash zone 3 of the vacuum tower. The heated oil, on introduction into the tower flash zone 3, flashes; that is, part of the heated oil which has remained liquid in the heating apparatus instantaneously enters the vapor state. This flashing of the heated hydrocarbon oil is at least in part the result of the reduced pressure at which the flash zone is maintained and the temperature at which the feed oil is introduced. Reduction of pressure in the flash zone is accomplished by means of conventional vacuum maintaining apparatus, not shown, in association with overhead vapor recovery means, also not shown. The vacuum maintaining apparatus may be of any conventional kind such as a vacuum pump; however, the normally used barometric condenser and steam jet of the conventional vacuum fractionation system is preferred.

Heated feed introduced at inlet 2 and partly vaporized in flash zone 3 results in vapors which rise through vapor passageways through a series of plates or trays 4. The trays 4 are designed to provide maximum liquid-vapor contact, and may be of any suitable type such as the conventional bubble cap tray shown. Other equivalent means may be employed, as will be evident to those skilled in the art. Trays 4 are provided with weirs 7 to maintain the proper liquid level on the tray. Downcomers 6 are provided for various trays to remove overflowing liquid to the next lower tray. The lower portions of downcomers 6, together with associated weirs 7 and accumulated liquid condensate, provide vapor seals between adjacent trays.

In the operation of the tower it will be understood that hot rising vapors are in countercurrent contact with liquid having nearly the same composition. The liquid on each tray is at about its boiling point; consequently, when contacted with the upflowing vapor, some of the liquid is vaporized and some of the vapor is condensed.

In the series of liquid-vapor contacts which make up normal countercurrent tower operation, the vapor becomes progressively rich in low boiling components and the liquid progressively rich in high boiling components.

As the vapor-liquid countercurrent contact continues in the tower, the liquid is separated out in the respective trays 4 according to its boiling point. Side-streams may be removed from any particular tray by means of draw-off lines such as line 9. Side-streams thus removed can be subjected to further processing or treatment, as desired.

In addition to the side-stream or streams mentioned above, a recycle stream 10 is withdrawn from pocket 11 of the bottom tray of the series. This recycle stream withdrawn by way of line 10 is recycled into a heater, not shown, and thence into the flash zone of the tower with the main oil feed.

Below the flash zone 3 is the stripping zone 24. The stripping member comprises a hollow, perforated, frusto-conical stripping member 28, mounted base upward, and connected to the flash zone 3 through a liquid trap or seal created by accumulated liquid from flash zone 3, together with flange 26 and weir 27. This liquid trap constitutes means permitting downflow of liquid from flash zone 3 into stripping zone 24, and prohibiting vapor interflow.

The stripping element 28 provides an improvement over conventional stripping means in that the structure employed provides little resistance to liquid flow. Accordingly, passage of unvaporized material through the stripping zone is accomplished quickly without appreciable sacrifice in stripping efficiency. The decrease in residence time for the tower bottoms is advantageous, since a higher temperature may be maintained in the tower without thermal decomposition of the bottoms.

Frusto-conical member 28 is provided with a plurality of relatively small, substantially uniformly spaced perforations, which are adapted to form the stripping steam into a plurality of jets and to direct said jets upwardly and toward the center or vertical axis of the stripping section. The aforesaid gas jets operate immediately to distribute substantially all liquid finding its way to the upper surface of member 28 into minute droplets of large surface areas. Accordingly, liquid to be stripped is quickly and thoroughly contacted with a relatively large quantity of stripping vapor in a short period of time. The surface of member 28 is therefore substantially free of liquid during operation.

Desirably, the angle of the upper surface of member 28 with the horizontal is greater than the angle of repose of solids encountered in the tower bottoms. By virtue of this expedient the stripping section is self-cleaning.

The member 28 is also provided with a hollow, cylindrical drain leg 30 attached to its open, lower end. Leg 30 is adapted to direct the liquid from which lighter ends have been stripped into bottoms accumulator 31. Leg 30 extends nearly to the bottom of accumulator 31 and is of slightly less diameter than the latter. Outlet line 32 is provided at the base of the bottoms accumulator 31, by means of which stripped bottoms may be removed.

It will be noted that bottoms accumulating compartment 31 is of a cross-sectional area equal only to a fraction, e. g., between about 0.05 and about 0.5 of the cross-sectional area of the tower. This constitutes a substantial reduction in the side of the bottoms accumulators normally employed. As a result the residence time of the bottoms in the stripping zone is further decreased. The design limits of the size of the bottoms accumulator 31 vary according to the type of charge and particularly according to the amount of tower bottoms produced from the charge.

Numeral 25 refers to a frusto-conical stripping zone cap, positioned base downward, and having a maximum diameter slightly greater than those of members 27 and 28. Cap 25 effectively divides the stripping zone from the flash zone. Cylindrical flange 26 is attached to the lower end of member 25 and overlaps weir 27 to form a liquid trap or seal, referred to hereinafter.

Connected to the upper end of stripping zone cap 25 is a vapor tube or pressure equalizing conduit 23. The conduit 23 is of relatively small diameter, e. g., of the order of 2 or 3 per cent of the tower diameter.

The diameter of conduit 23 should be sufficiently large to carry off vapors and stripping steam from the stripping zone 24 without an appreciable pressure drop. Vapor conduit 23 should be of sufficient length to extend into the fractionating zone, preferably as near the top as practicable, to permit the operation of the stripping zone at substantially the same absolute pressure level existing in the upper portion of the fractionating zone. Conduit 23 in Figure 1 is preferably positioned approximately in the center of the fractionating tower and is attached to the fractionating trays through which it passes. Through this expedient, it will be seen that conduit 23, in addition to serving as a pressure equalizing conduit, also acts as a tray support, thus providing increased structural strength to the tower and trays. Although the vapor conduit is preferably positioned centrally of the tower for the reasons indicated, many important advantages are still achieved where the vapor conduit passes externally or other than centrally of the tower from the stripping zone to a fractionating zone.

Although in Figure 1, as preferred, vapor conduit 23 extends from the stripping zone to the compartment immediately below the top tray, conduit 23 may be of longer or shorter length. However, tubes of shorter length are less desirable, since the advantages produced thereby are proportionately less. Normally, it is preferable for the vapors discharging from the upper end of conduit 23 to be contacted with condensate, prior to entry into the top of the tower. For this reason, it is usually desirable that conduit 23 terminate short of the top of the fractionating section.

The connection between the flash zone and the stripping zone shown in Figure 1 comprises a liquid trap or seal created by accumulated liquid from flash zone 3 and by flange 26 (part of the stripping zone cap 25) and by weir 27. The liquid seal provides a means for permitting liquid hydrocarbons to pass from the flash zone into the stripping zone without passage of vapors from stripping zone 24 into flash zone 3 or in the reverse direction. Other sealing means may be employed. With the seal as shown, liquid from the flash zone moves downwardly to the inside of tray 28 toward the bottoms accumulator 31. Stripped bottoms are removed from liquid accumulating compartment 31 by way of line 32.

Stripping steam is introduced into the stripping zone from line 12 through line 18. Valve 17 is provided on the stripping steam feed line to control the amount of steam. The quantity of stripping steam used depends on the composition of the bottoms and the degree of vaporization obtained in the flash zone. The stripping steam introduced into the stripping zone removes lower boiling components from the liquid bottoms and passes upwardly with these light components through vapor conduit 23, into the upper portion of the tower.

Steam may be introduced into the flash zone from line 12 through line 15, if desired. A valve 13 is provided in the steam line 12 to control the amount of steam introduced into the flash zone. The amount of steam introduced into the flash zone (where this expedient is used) depends on the composition of the feed, the temperature of the feed and the pressure in the flash zone. While it is possible to operate the tower without the introduction of steam into the flash zone, normal operations include the use of steam.

Figure 2:
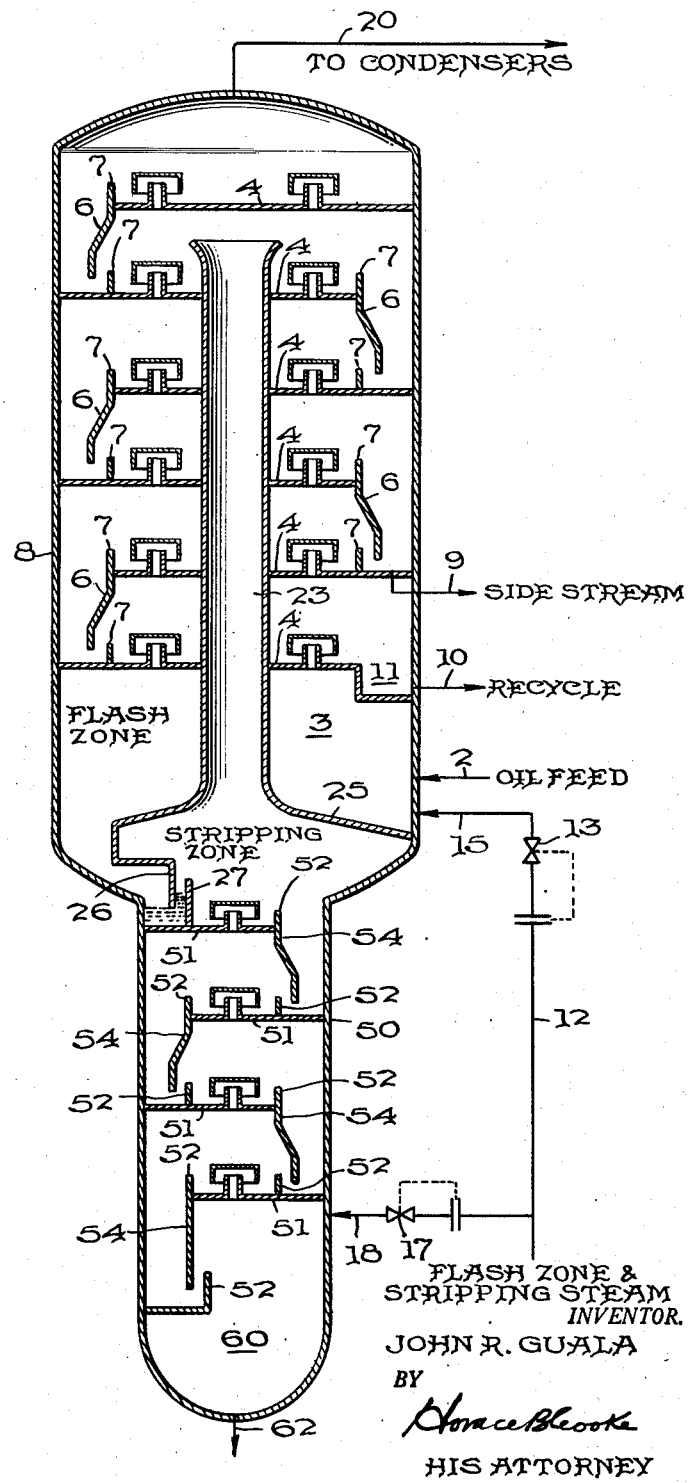
Figure 2 is a diagrammatic view of another modification of this invention.

Figure 2 is a schematic representation of another vacuum fractionating tower embodying the principles of the invention. The illustrated apparatus of Figure 2 differs over that shown in Figure 1 merely in that a conventional bubble cap tray stripping section 50 is employed. In Figure 2 stripping steam from line 12 passes through valve 17, through line 18, and into the bottom of stripping section 50. The steam passes upwardly through the series of bubble cap trays 51 in countercurrent contact with liquid flowing downwardly across trays 51.

Liquid overflow from each of trays 51 passes to the next lower compartment by way of downcomers 54. A vapor seal is provided between adjacent compartments by the accumulated liquid in each downcomer and its adjacent weir 52. Stripped liquid collects in bottoms accumulating compartment 60 and is removed through line 62.

Stripping vapor and vaporized components pass upwardly through vapor conduit 23 as previously described. The flash section, the fractionating section, overhead product recovery system, etc., for Figure 2 operate similarly as correspondingly numbered elements of Figure 1.

In the normal operation of vacuum fractionating systems, the introduction of additional quantities of stripping steam produces a greater yield of overhead at the expense of the bottoms. However, the additional steam used increases the pressure drop through the tower and the load on vacuum apparatus. The amount of additional stripping steam which may be used in conventional systems therefore is limited by the amount of the pressure drop resulting from such addition.

The tower provided by this invention, however, substantially overcomes this difficulty and avoids the increased pressure drop created by additional amounts of steam. The invention therefore permits the use of additional amounts of stripping steam without the normally present disadvantages. Moreover, as will be readily apparent from Figure 3 of the drawings, and the table 1 below, the introduction of additional quantities of steam into the tower of this invention produces an unexpected rate of increase in total overhead, as compared with the addition of the same quantity of additional steam into the stripping zone of a conventional tower. The table 1 presents comparative figures illustrating the increase in total overhead yield obtainable by the invention as compared to the yields obtainable with a conventional tower (having no pressure equalizing conduit) using the same quantities of steam.

TABLE 1

| | Net tower charge, B./H. | Recycle, B./H. | Total tower charge, B./H. | Additional steam, lbs./hr. | Total overhead, B./H. | Bottoms, B./H. | Differential overhead (C) minus (B), B./H. |
|---|---|---|---|---|---|---|---|
| A—Base operation | 616.5 | 64.5 | 681.0 | | 347.3 | 333.7 | |
| B—Conventional tower | 616.5 | 64.5 | 681.0 | 5,840 | 401.8 | 279.2 | |
| | | | | 2,392 | 371.1 | 309.9 | |
| | | | | 1,253 | 362.3 | 318.7 | |
| | | | | 545 | 357.5 | 323.5 | |
| C—New tower | 616.5 | 64.5 | 681.0 | ¹ 5,840 | 447.3 | 233.7 | ¹ 45.5 |
| | | | | ¹ 2,392 | 414.0 | 267.0 | ¹ 42.0 |
| | | | | ¹ 1,253 | 397.4 | 283.6 | ¹ 35.1 |
| | | | | ¹ 545 | 380.7 | 300.3 | ¹ 23.2 |

Figure 3:
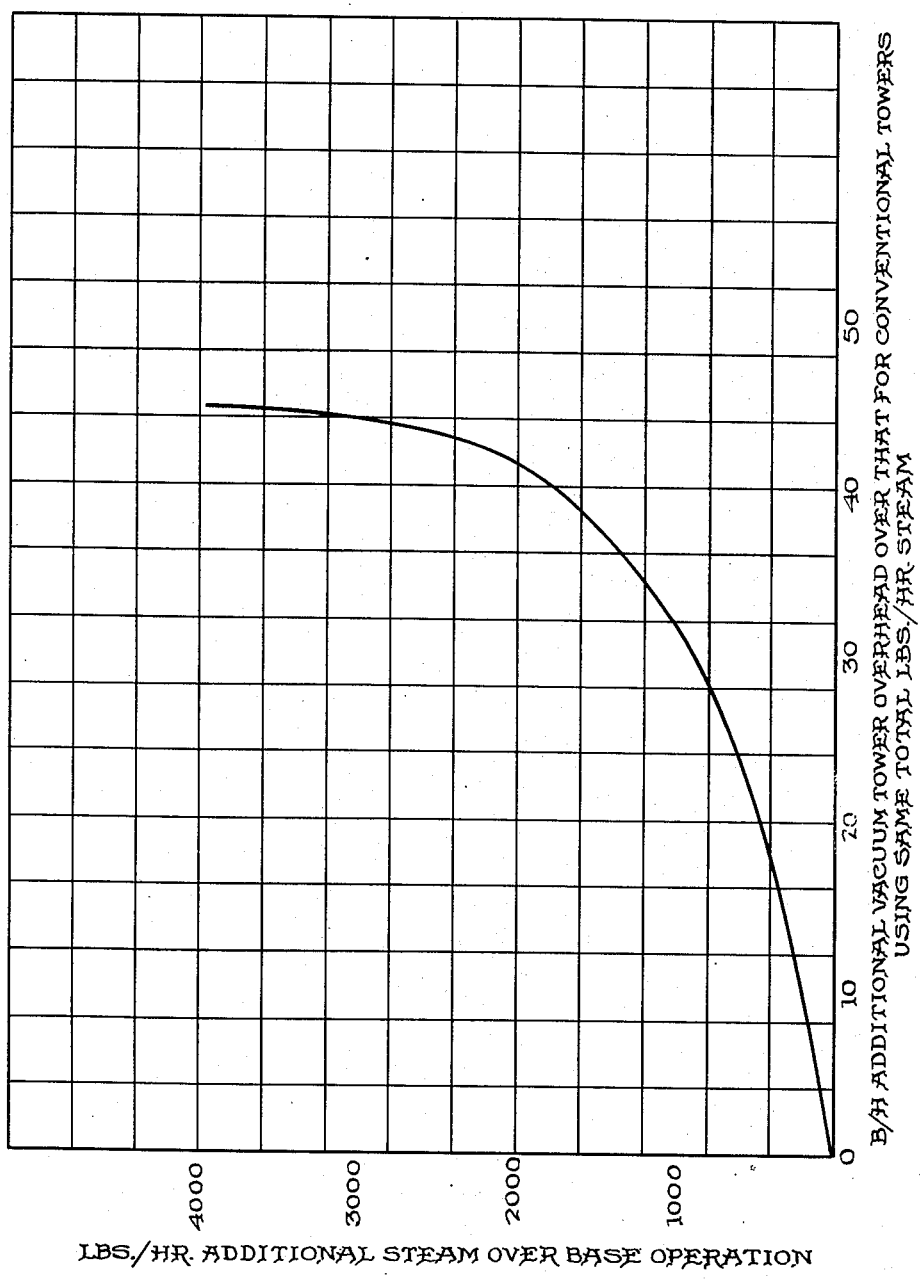
Figure 3 is a graphic plot of total overhead against pounds steam/hour illustrating the improvement achieved by the invention.

¹ Values plotted in Figure 3.

From the figures presented in table 1, it will be obvious that a given amount of stripping steam in a tower embodying the invention produces a substantial increase in the total overhead, at the expense of the tower bottoms. Further, reference to Figure 3 indicates that as the additional steam approaches about 1000 lbs./hr. above base operation, the rate of increase in overhead is rapid. Where the increment of steam above base operation steam is above about 1000 lbs./hr., the total overhead product continues to increase to a limit, but the rate of increase in overhead is reduced. It is therefore more efficient to operate with increments of steam producing the greatest rate of increase in overhead. However, such values may be exceeded substantially, where maximum recovery of overhead is desired.

The invention is advantageous in connection with the vacuum distillation of any liquid mixture, particularly those containing constituents subject to thermal decomposition at normal distillation temperature. By way of example, the invention is suitable for the vacuum fractionation of topped crude petroleum to produce a clean cracking stock. Although the invention is particularly suited to increased production of catalytic cracking stock, it may also be used in the production of pressure still stock for thermal cracking operations, for the redistillation of pressure distillate, pressed distillate, or bright stock solution. The invention may also be used to reduce a tar stock to asphalt or pitch. It is understood that the greatest value of the invention is in connection with those processes where the maximum amount of vaporization is desired at the expense of the bottoms.

It will be understood by those skilled in the art that the invention is not limited to the particular structure shown in the drawings, that various types of reflux may be provided, and that certain other conventional variations of vacuum distillation systems may be utilized.

Among the advantages produced by the invention are the increased production of total overhead products and the reduction in vacuum tower bottoms. Also, the modification disclosed in Figure 1 of the drawings is of particular advantage in that the maximum permissible temperature within the tower may be increased without increased thermal decomposition. A further advantage of the invention is the increase in stripping steam permitted without unduly overburdening the vacuum producing apparatus. Significantly, the rate of increase in total overhead products is also improved with increased quantities of stripping steam. A further advantage resides in the simplicity and economy of construction. Another important advantage resides in the increased structural strength of the tower.

Although certain specific modifications of the invention have been described and shown, it is understood that various alterations may be made without departing from the spirit of the invention.

What I claim is:

1. A vacuum fractionation process comprising introducing preheated liquid-containing feed into a flash zone, passing vaporized constituents upwardly into the bottom of a fractionating zone, passing these vapors through the fractionating zone in countercurrent contact with downflowing condensate, passing unvaporized liquid from the flash zone downwardly through a stripping zone in countercurrent contact with upflowing stripping vapor, passing stripped and stripping vapors directly from the stripping zone into the fractionating zone substantially above the bottom thereof whereby the pressure drop between the top of the fractionating zone and the stripping zone is reduced substantially, maintaining a partial vacuum at the top of the fractionating zone and thus throughout the other zones, removing unvaporized liquid from the bottom of the stripping zone and removing fractionated material from the fractionating zone.

2. The process of claim 1 where the stripping vapor is directed upwardly and toward the center of the stripping zone in the form of a plurality of jets.

3. A process for the vacuum distillation of normally liquid mixtures comprising introducing preheated liquid feed into a flash zone, passing vaporized constituents from the flash zone upwardly through a series of vertically spaced fractionating zones in countercurrent contact with downflowing condensate, passing unvaporized liquid from the flash zone downwardly through a stripping zone in countercurrent contact with stripping vapor flowing upwardly therethrough, passing stripped and stripping vapors directly from the stripping zone into one of the fractionating zones above the lowermost in the series, whereby the pressure drop between the top of the fractionating zone and the stripping zone is reduced substantially, maintaining a partial vacuum at the top of the fractionting zone, and thus throughout the other zones, removing unvaporized liquid from the bottom of the stripping zone, and removing fractionated material from the fractionating zone.

4. The process for the vacuum distillation of normally liquid mixtures comprising introducing preheated feed into a flash zone, passing vaporized constituents from the flash zone upwardly through a series of vertically spaced fractionating zones in countercurrent contact with downflowing condensate, passing unvaporized liquid from the flash zone downwardly through a stripping zone in countercurrent contact with stripping vapor flowing upwardly therethrough, maintaining a liquid seal between the flash zone and stripping zone to prevent interflow of vapor, passing stripped and stripping vapors directly from the stripping zone into one of the fractionating zones above the lowermost in the series, whereby the pressure drop between the top of the fractionating zone and the stripping zone is reduced substantially, said passage of stripping and stripped vapors being directed in a path positioned substantially centrally through the fractionating zones, maintaining a partial vacuum at the top of the fractionating zone and thus throughout the other zones, removing unvaporized liquid from the bottom of the stripping zone, and removing fractionated material from the fractionating zone.

5. The process of claim 4 where the stripping and stripped vapors are passed directly from the top of the stripping zone to the fractionating zone just beneath that topmost in the series.

6. Vacuum fractionating apparatus comprising a tower, means in the upper portion thereof forming a fractionating section, means in the lower portion thereof forming a stripping section, means for introducing stripping vapors into the stripping section, a compartment within the tower between the fractionating section and the stripping section forming a flash section, means for introducing preheated feed into the flash section, means forming a vapor passageway between the flash section and the bottom of the fractionating section, means at the bottom of the flash section forming a connection with the stripping section and adapted to permit flow of liquid from the flash section to the stripping section, a vapor conduit connected to the stripping section and adapted to discharge into the fractionating section substantially above the bottom thereof, means in association with the top of the tower for maintaining a partial vacuum therein, means for removing unvaporized liquid from the bottom of the stripping zone and means for removing fractionated material from the fractionating section.

7. The apparatus of claim 6 including means in the stripping section for forming stripping vapor into a plurality of jets and for directing said jets upwardly and toward the center of the stripping section.

8. Vacuum fractionating apparatus comprising a tower, a series of vertically spaced fractionating sections positioned in the upper portion thereof, a stripping section positioned in the lower portion of said tower, a flash section positioned intermediately of said stripping and fractionating zones, means permitting upward passage of vapors from the flash zone into the lowest fractionating section in the series, means permitting downward passage of liquid from each fractionating section to that next lower in the series, means forming a liquid trap permitting downward passage of liquid from the flash section into the stripping section and preventing interflow of vapor therebetween, a vapor conduit connecting the top of the stripping section directly to one of the fractionating sections above the lowermost in the series, means for withdrawing fractionated material from the fractionating section, means for introducing preheated feed into the flash section, means for introducing stripping vapor into the stripping section, means for withdrawing tower bottoms from the bottom of the stripping zone, and means in association with the top of the tower for maintaining a partial vacuum in said tower.

9. The apparatus of claim 8 wherein the vapor conduit is positioned substantially centrally of said tower and passes through the flash section and a portion of the fractionating sections.

10. The apparatus of claim 8 wherein the vapor conduit extends into the fractionating section directly beneath the topmost section of the series.

11. The apparatus of claim 8 wherein the stripping section contains a stripping member comprising a hollow, perforated, frusto-conical member positioned base upward within the tower, and means for introducing stripping vapors between the tower and said frusto-conical member.

12. Vacuum distillation apparatus comprising a tower, a series of fractionating trays transversely mounted within the upper portion of said tower and spaced vertically apart from each other, said trays being adapted to retain accumulated liquid on their upper surfaces, means permitting downward flow of excess liquid from each tray to that next beneath it in the series, a flash compartment within said tower beneath the lowermost fractionating tray, means for introducing preheated feed into said flash compartment, means permitting upward flow of vapors from said flash compartment through the series of fractionating trays and the accumulated liquid retained on their upper surface, a stripping compartment within said tower and positioned beneath said flash compartment, means permitting flow of unvaporized liquid from said flash compartment to said stripping compartment but preventing interflow of vapor, stripping means within said stripping compartment comprising a hollow, perforated, frusto-conical member, positioned base upward and adapted to receive unvaporized liquid from the flash zone into its open upper end, means for introducing a stripping medium into said tower beneath said perforated frusto-conical member, a pressure-equalizing conduit positioned substantially centrally within the tower and connected at its lower end to the upper portion of the stripping compartment, said conduit joining directly the stripping compartment and a space above a fractionating tray high in the tower, said conduit being attached to each fractionating tray through which it passes, means in association with the top of the tower for maintaining partial vacuum in said tower, means for removing vapors from the space above the topmost fractionating tray, means for removing accumulated liquid from the lowermost fractionating tray, means for removing at least one side-stream from an intermediate fractionating tray, and means for removing unvaporized liquid from the bottom of said stripping compartment.

13. The apparatus of claim 12, including in addition, a liquid-accumulating compartment at the bottom of the stripping compartment whose cross-sectional area is in a ratio to the cross-sectional area of the tower of between about 0.05:1 and about 0.5:1.

JOHN R. GUALA.

References Cited in the file of this patent

UNITED STATES PATENTS

| Number | Name | Date |
| --- | --- | --- |
| 1,257,470 | Filippo | Feb. 26, 1918 |
| 2,237,271 | Dunham | Apr. 1, 1941 |
| 2,358,272 | Willkie | Sept. 12, 1944 |
| 2,489,509 | Straight | Nov. 29, 1949 |
| 2,559,129 | Miller | July 3, 1951 |